United States Patent
Lee et al.

(10) Patent No.: US 7,995,677 B2
(45) Date of Patent: Aug. 9, 2011

(54) APPARATUS AND METHOD FOR DETECTING SIGNAL BY MAXIMUM LIKELIHOOD

(75) Inventors: Jong-Ho Lee, Seoul (KR); Sang-Boh Yun, Seongnam-si (KR); Young-Hoon Kwon, Seongnam-si (KR); Sung-Soo Hwang, Yongin-si (KR); Sung-Yoon Jung, Seoul (KR); Soong-Yoon Choi, Suwon-si (KR); Hyun-Cheol Park, Daejeon (KR); Hyoun-Kuk Kim, Ulsan (KR)

(73) Assignees: Samsung Electronics Co., Ltd., Suwon-si (KR); Information and Communications University, Research and Industrial Cooperation Group, Daejeon (KR)

( * ) Notice: Subject to any disclaimer, the term of this patent is extended or adjusted under 35 U.S.C. 154(b) by 645 days.

(21) Appl. No.: 12/157,627

(22) Filed: Jun. 12, 2008

(65) Prior Publication Data
US 2009/0028265 A1 Jan. 29, 2009

(30) Foreign Application Priority Data
Jun. 12, 2007 (KR) .................. 10-2007-0057243

(51) Int. Cl.
*H03K 9/00* (2006.01)

(52) U.S. Cl. .................. 375/316; 375/340; 375/262
(58) Field of Classification Search .................. 375/316, 375/346, 347, 349, 340, 262, 267
See application file for complete search history.

(56) References Cited

U.S. PATENT DOCUMENTS

| | | | |
|---|---|---|---|
| 7,292,661 B1 * | 11/2007 | Chan et al. ............ | 375/346 |
| 2004/0001538 A1 * | 1/2004 | Garrett .................. | 375/229 |
| 2007/0127589 A1 | 6/2007 | Hwang et al. | |
| 2008/0049862 A1 * | 2/2008 | Dean et al. ............ | 375/267 |

FOREIGN PATENT DOCUMENTS

| | | |
|---|---|---|
| KR | 10-2007-0052037 | 5/2007 |
| WO | WO 2005/057838 A1 | 6/2005 |

* cited by examiner

*Primary Examiner* — Emmanuel Bayard (57) ABSTRACT

An apparatus and method for detecting a signal in a receiver by maximum likelihood (ML) are provided, in which symbols are detected according to the number of transmit antennas of a transmitter and a modulation scheme, channels are estimated, an equivalent channel matrix corresponding to the estimated channels is determined, a permuted equivalent channel matrix is determined by multiplying the equivalent channel matrix by a predetermined permutation matrix, the permuted equivalent channel matrix is QR decomposed, a hard decision is performed on predetermined symbols among the detected symbols using a received signal resulting from the QR decomposition, and the log likelihood ratios (LLRs) of the hard-decided symbols are determined.

14 Claims, 5 Drawing Sheets

APPARATUS AND METHOD FOR DETECTING SIGNAL BY MAXIMUM LIKELIHOOD

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jun. 12, 2007 and assigned Serial No. 2007-57243, the entire disclosure of which is hereby incorporated by reference.

TECHNICAL FIELD OF THE INVENTION

The present invention generally relates to a wireless communication system. More particularly, the present invention relates to an apparatus and method for detecting a signal by maximum likelihood (ML).

BACKGROUND OF THE INVENTION

In general, a wireless communication system with multiple transmit/receive antennas has a larger channel capacity than a single-antenna wireless communication system.

Double space time transmit diversity (DSTTD) implements two Alamouti STTDs. The Alamouti STTD-based communication system achieves a transmit diversity gain, especially a spatial multiplexing gain, due to its parallel structure. Meanwhile, the multi-antenna wireless communication system can operate using orthogonal frequency division multiplexing (OFDM) to minimize frequency selective fading.

To obtain optimal performance, a DSTTD-OFDM communication system should use an ML receiver. However, real implementation of the DSTTD-OFDM communication system is hard because the use of an ML receiver requires exponential functional complexity in the number of transmit antennas and the modulation order used.

SUMMARY OF THE INVENTION

To address the above-discussed deficiencies of the prior art, it is a primary aspect of exemplary embodiments of the present invention to address at least the problems and/or disadvantages and to provide at least the advantages described below. Accordingly, an aspect of exemplary embodiments of the present invention is to provide an ML detection apparatus and method for reducing computational volume.

In accordance with an aspect of exemplary embodiments of the present invention, there is provided a method for detecting symbols from a received signal according to the number of transmit antennas of a transmitter and a modulation scheme; estimating channels using the detected symbols; determining an equivalent channel matrix corresponding to the estimated channels; determining a permuted equivalent channel matrix by multiplying the equivalent channel matrix by a predetermined permutation matrix; performing QR decomposition on the permuted equivalent channel matrix; performing a hard decision on first symbols among the detected symbols using symbols obtained from the QR decomposition; and determining the log likelihood ratios (LLRs) of second symbols other than the first symbol among the detected symbols using the hard-decided symbols and combinations of the first symbols.

In accordance with another aspect of exemplary embodiments of the present invention, there is provided an apparatus for detecting a signal in a receiver by ML, in which a symbol detector for detecting symbols from a received signal according to the number of transmit antennas of a transmitter and a modulation scheme; a channel estimator for estimating channels and determining an equivalent channel matrix corresponding to the estimated channels; a QR decomposer for determining a permuted equivalent channel matrix by multiplying the equivalent channel matrix by a predetermined permutation matrix and performing QR decomposition on the permuted equivalent channel matrix; and a log likelihood ratios (LLR) calculator for performing hard decision on first symbols among the detected symbols using the symbols obtained from the QR decomposition and determining the log likelihood ratios (LLRs) of second symbols other than the first symbol among the detected symbols using the hard-decided symbols and combinations of the first symbols.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide an ML detection apparatus and method for reducing computational volume in a multi-antenna wireless communication system. This wireless communication system can be a DSTTD-OFDM communication system.

Figure 1:
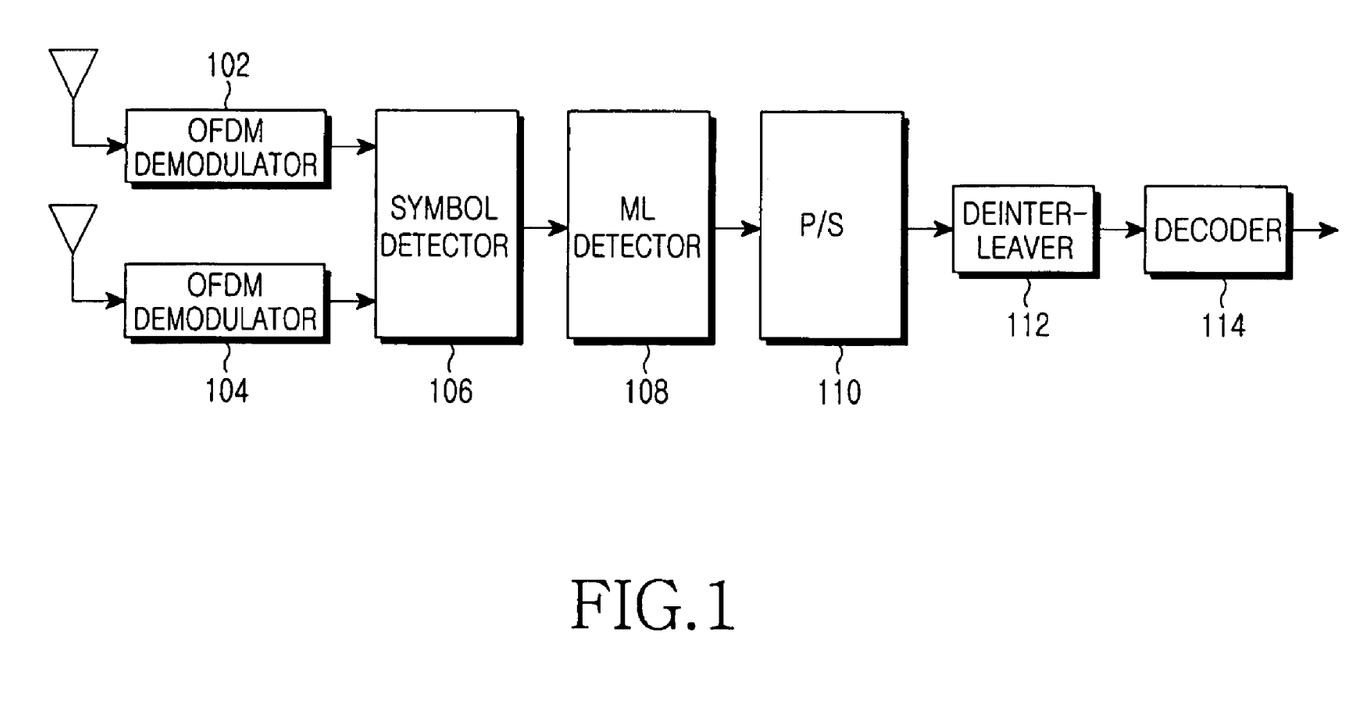
FIG. 1 is a block diagram of a receiver in a DSTTD-OFDM communication system to which the present invention can be applied.

FIG. 1 is a block diagram of a receiver in a DSTTD-OFDM communication system to which the present invention can be applied.

Referring to FIG. 1, the receiver includes OFDM demodulators 102 and 104 for demodulating received OFDM signals, a symbol detector 106 for detecting symbols received during a predetermined number of symbol intervals from the demodulated OFDM signals, an ML detector 108 for ML-detecting the detected symbols, a parallel-to-serial (P/S) converter 110 for converting parallel signals to a serial signal, a deinterleaver 112 for deinterleaving the serial signal, and a decoder 114 for decoding the deinterleaved signal. The ML detector 108 performs ML detection schemes for reducing computational volume according to the present invention.

A description will be made of a first ML detection scheme for reducing computational volume, and a second ML detection scheme being an improvement of the first ML detection scheme in the DSTTD-OFDM communication system according to exemplary embodiments of the present invention.

Compared to a conventional ML detection scheme that requires computations for a total of $|\Omega|^4$ candidates to decide the log likelihood ratios (LLRs) of a symbol to be decoded, the first ML detection scheme of the present invention needs computations for no more than $2|\Omega|^2$ candidates and the second ML detection scheme advanced from the first ML detection scheme needs only $2|\Omega|^2$ candidates to determine the LLR. $\Omega$ represents a set of all candidates for a single transmitted symbol, and $|\Omega|$ represents the number of elements in the set.

1. First ML Detection Scheme

Before describing the first ML detection scheme, it is assumed that DSTTD-OFDM channels experience frequency selective fading, the cyclic prefix (CP) length is longer than the channel impulse response, and the channel response is frequency-flat, constant for one frame duration.

A coding matrix for subcarrier k is:

$$C^k = \begin{bmatrix} s_1^k & s_2^k & s_3^k & s_4^k \\ -s_2^{k*} & s_1^{k*} & -s_4^{k*} & s_3^{k*} \end{bmatrix}^T, \quad [\text{Eqn. 1}]$$

and a vector received on subcarrier k is:

$$r^k = H^k C^k + \underline{n}^k \quad [\text{Eqn. 2}]$$

$$H^k = \begin{bmatrix} h_{11}^k & h_{12}^k & h_{13}^k & h_{14}^k \\ h_{21}^k & h_{22}^k & h_{23}^k & h_{24}^k \end{bmatrix}.$$

For signals received during two symbol intervals at the receiver after CP elimination, the equivalent signal model is given as:

$$H^k = \begin{bmatrix} h_{11}^k & h_{12}^k & h_{13}^k & h_{14}^k \\ h_{21}^k & h_{22}^k & h_{23}^k & h_{24}^k \end{bmatrix} \quad [\text{Eqn. 3}]$$

-continued $$y^k = [r_1^k(2n) r_1^{k*}(2n+1) r_2^k(2n) r_2^{k*}(2n+1)]^T$$

$$y^k = H_{\textit{eff}}^k s^k + n^k$$

$$H_{\textit{eff}}^k = \begin{bmatrix} h_{11}^k & h_{12}^k & h_{13}^k & h_{14}^k \\ h_{12}^{k*} & -h_{11}^{k*} & h_{14}^{k*} & -h_{13}^{k*} \\ h_{21}^k & h_{22}^k & h_{23}^k & h_{24}^k \\ h_{22}^{k*} & -h_{21}^{k*} & h_{24}^{k*} & -h_{23}^{k*} \end{bmatrix},$$

where $s^k$ denotes a symbol vector transmitted on subcarrier k expressed as $s^k = [s_1^k\ s_2^k\ s_3^k\ s_4^k]^T$, $h_{ij}^k$ denotes a channel frequency response that subcarrier k experiences between a $j^{th}$ transmit antenna and an $i^{th}$ receive antenna expressed as $$h_{ij}^k = \sum_{l=1}^{L} h_{ij}(l) e^{-j\frac{2\pi kl}{N_c}}$$

where $N_c$ is a fast Fourier transform (FFT) size and L is the length of a channel impulse response, n denotes the index of an OFDM symbol, and $H_{\textit{eff}}^k$ denotes an equivalent channel matrix representing the characteristics of channels.

If the equivalent channel matrix $H_{\textit{eff}}^k$ is to be QR-decomposed, permutation should precede the QR decomposition. The equivalent channel matrix is first permuted using a predetermined permutation matrix and then QR-decomposed. QR decomposition is decomposition of a given matrix into a unitary matrix Q and an upper triangular matrix R.

Hereinafter, $H_{\textit{eff}}^k$ will be described separately as $H_{\textit{eff}}^U$ and $H_{\textit{eff}}^D$. Hence, $H_{\textit{eff}}^{(U)} = \Pi^{(U)} H_{\textit{eff}}$ and $H_{\textit{eff}}^{(U)} = Q^{(U)} R^{(U)}$ where Q is a unitary matrix, R is an upper triangular matrix, and $\Pi^{(U)}$ is the predetermined permutation matrix. The permutation matrix $\Pi^{(U)}$ can be:

$$\Pi^{(U)} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}, \quad [\text{Eqn. 4}]$$

and the upper triangular matrix $R^{(U)}$ is given as:

$$= \begin{bmatrix} R_{1,1}^{(U)} & 0 & R_{1,3}^{(U)} & R_{1,4}^{(U)} \\ 0 & R_{1,1}^{(U)} & -R_{1,4}^{(U)*} & R_{1,3}^{(U)*} \\ 0 & 0 & R_{3,3}^{(U)} & 0 \\ 0 & 0 & 0 & R_{3,3}^{(U)} \end{bmatrix}. \quad [\text{Eqn. 5}]$$

Using Equation 4 and Equation 5, the LLRs of a transmitted symbol can be computed by:

$$\tilde{y} = Q^{(U)H} y = R^{(U)} s + \tilde{n}^{(U)}, \quad [\text{Eqn. 6}]$$

$$Pr(\tilde{y} \mid s) = \frac{1}{(2\pi\sigma^2)^{N_r}} \exp\left(-\frac{1}{2\sigma^2} \|\tilde{y} - R^{(U)} s\|^2\right)$$

$$LLR(b_i^q) \approx$$

$$\frac{1}{2\sigma^2} \left( \min_{s_k \mid b_i^q = -1} \|\tilde{y} - R^{(U)} s_k\|^2 - \min_{s_k \mid b_i^q = +1} \|\tilde{y} - R^{(U)} s_k\|^2 \right)$$

q: the q-th transmitter, i: the i-th bit, where $Pr(\tilde{y}|s)$ denotes the probability of receiving a signal y when the transmitted symbol vector is s, $\sigma^2$ denotes a noise power, $b_i^q$ denotes an $i^{th}$ bit of a $q^{th}$ transmitted symbol, and $s_k$ denotes a $k^{th}$ transmitted symbol vector among all possible transmitted symbol vectors.

After the QR decomposition, the received signal vector can be expressed as:

$$\tilde{y}=Q^{(U)H}y=R^{(U)}s+\tilde{n}^{(U)},$$

$$\tilde{y}_1^{(U)}=R_{11}^{(U)}s_1+R_{13}^{(U)}s_3+R_{14}^{(U)}s_4+\tilde{n}_1^{(U)}$$

$$\tilde{y}_2^{(U)}=R_{11}^{(U)}s_2+R_{14}^{*(U)}s_3-R_{13}^{*(U)}s_4+\tilde{n}_2^{(U)}.$$

$$\tilde{y}_3^{(U)}=R_{33}^{(U)}s_3+\tilde{n}_3^{(U)}$$

$$\tilde{y}_4^{(U)}=R_{33}^{(U)}s_4+\tilde{n}_4^{(U)} \quad \text{[Eqn. 7]}$$

$\tilde{y}_1^{(U)}$ and $\tilde{y}_2^{(U)}$ depicted in Equation 7 will first be described below.

If the ML result of $[s_3, s_4]^T$ is already known, $[s_1, s_2]^T$ can be found out by Decision-Feedback (DF) detection with hard decision without calculating Euclidean distances. However, to find out the ML result of $[s_3, s_4]^T$, all possible combinations of $[s_3, s_4]^T$ should be considered. While all possible $[s_1, s_2]^T$ values can be obtained by applying the DF detection with hard decision scheme to each $[s_3, s_4]^T$ combination, all possible combinations of $[s_3, s_4]^T$ should be taken into account to obtain the ML result of $[s_3, s_4]^T$.

Each of the number of total candidates of $[s_1, s_2]^T$ including the ML result of $[s_1, s_2]^T$ and the number of total candidates of $[s_3, s_4]^T$ including the ML result of $[s_3, s_4]^T$ is $|\Omega|^2$. Meanwhile, since all possible candidates are considered for $[s_3, s_4]^T$, accurate LLRs of $[s_3, s_4]^T$ can be detected, but it may occur that the LLR of a particular bit in $[s_1, s_2]^T$ cannot be calculated. Therefore, the LLRs of $[s_3, s_4]^T$ are determined by:

$\Phi^{(U)}$: candidate vector from all possible combinations of $s_3$ [Eqn. 8]
and $s_4$ with $DF$ detection $|\Phi^{(U)}|$: the cardinality of $\Phi^{(U)}$, i.e. $|\Phi^{(U)}| = |\Omega|^2 s_k$: element of $\Phi^{(U)}$ $$LLR(b_i^q) \approx \frac{1}{2\sigma^2}\left(\min_{s_k \in \Phi^{(U)}|b_i^q=-1}\|\tilde{y}-R^{(U)}s_k\|^2 - \min_{s_k \in \Phi^{(U)}|b_i^q=+1}\|\tilde{y}-R^{(U)}s_k\|^2\right),$$

$$q \in \{3, 4\}.$$

Now how the LLRs of $[s_1, s_2]^T$ are decided will be described.

The following permuted equivalent channel matrix $H_{eff}^{(D)}$ is considered:

$$H_{eff}^{(D)} = \Pi^{(D)}H_{eff}, \quad \text{[Eqn. 9]}$$

$$\Pi^{(D)} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}.$$

As in Equation 5, $H_{eff}^{(D)}$ is QR-decomposed into:

$$H_{eff}^{(D)} = Q^{(D)}R^{(D)} \quad \text{[Eqn. 10]}$$

$$R^{(D)} = \begin{bmatrix} R_{1,1}^{(D)} & 0 & R_{1,3}^{(D)} & R_{1,4}^{(D)} \\ 0 & R_{1,1}^{(D)} & -R_{1,4}^{(D)*} & R_{1,3}^{(D)*} \\ 0 & 0 & R_{3,3}^{(D)} & 0 \\ 0 & 0 & 0 & R_{3,3}^{(D)} \end{bmatrix}.$$

The permutation matrix $\Pi^{(D)}$ permutes the sequence of the transmitted signal vector according to Equation 11, and the resulting changed received signal vector is given by Equation 12:

$$\tilde{s}=[s_3 s_4 s_1 s_2]^T=\Pi^{(D)}s, \quad \text{[Eqn. 11]}$$

$$\tilde{y}=Q^{(D)H}y=R^{(D)}\tilde{s}+\tilde{n}^{(D)},$$

$$\tilde{y}_1^{(D)}=R_{11}^{(D)}s_3+R_{13}^{(D)}s_1+R_{14}^{(D)}s_2+\tilde{n}_1^{(D)}$$

$$\tilde{y}_2^{(D)}=R_{11}^{(D)}s_4+R_{14}^{*(D)}s_1-R_{13}^{*(D)}s_2+\tilde{n}_2^{(D)}.$$

$$\tilde{y}_3^{(D)}=R_{33}^{(U)}s_1+\tilde{n}_3^{(D)}$$

$$\tilde{y}_4^{(D)}=R_{33}^{(U)}s_2+\tilde{n}_4^{(D)} \quad \text{[Eqn. 12]}$$

Similar to Equation 8 that decides the LLRs of $[s_3, s_4]^T$, the LLRs of $[s_1, s_2]^T$ are decided by:

$\Phi^{(D)}$: candidate vector from all possible [Eqn. 13]
combinations of $s_1$ and $s_2$ with $DF$ detection
$|\Phi^{(D)}|$: the cardinality of $\Phi^{(D)}$, i.e. $|\Phi^{(D)}| = |\Omega|^2 \min_{s_k \in \Phi^{(D)}|b_i^q=+1}\|\tilde{y}-R^{(D)}s_k\|^2$ $$LLR(b_i^q) \approx \frac{1}{2\sigma^2}$$

$$\left(\min_{s_k \in \Phi^{(D)}|b_i^q=-1}\|\tilde{y}-R^{(D)}\tilde{s}_k\|^2 - \min_{s_k \in \Phi^{(D)}|b_i^q=+1}\|\tilde{y}-R^{(D)}\tilde{s}_k\|^2\right),$$

$$q \in \{1, 2\}.$$

In summary, the LLRs of each symbol can be determined by:

LLR of $[s_1, s_2]^T$ [Eqn. 14]

$$LLR(b_i^q) \approx \frac{1}{2\sigma^2}$$

$$\left(\min_{s_k \in \Phi^{(D)}|b_i^q=-1}\|\tilde{y}-R^{(D)}\tilde{s}_k\|^2 - \min_{s_k \in \Phi^{(D)}|b_i^q=+1}\|\tilde{y}-R^{(D)}\tilde{s}_k\|^2\right),$$

$$q \in \{1, 2\}$$

LLR of $[s_3, s_4]^T$ $$LLR(b_i^q) \approx$$

$$\frac{1}{2\sigma^2}\left(\min_{s_k \in \Phi^{(U)}|b_i^q=-1}\|\tilde{y}-R^{(U)}s_k\|^2 - \min_{s_k \in \Phi^{(U)}|b_i^q=+1}\|\tilde{y}-R^{(U)}s_k\|^2\right),$$

$$q \in \{3, 4\}.$$

For example, to compute the LLRs of $[s_1, s_2]^T$ by Equation (14), $\|\tilde{y}-R^{(D)}\tilde{s}_k\|^2$ is first computed for every possible combination of $\tilde{s}_k=[s_1, s_2]^T$ ($4^2=16$ combinations, k=0, 1, ..., 15 in quadrature phase shift keying (QPSK)). Then, bit information included in $s_1$ (2 bits for a QPSK symbol), $b_0^1$ and $b_1^1$ and bit information included in $s_2$, $b_0^2$ and $b_1^2$ are calculated based on 16 values of $\|\tilde{y}-R^{(D)}\tilde{s}_k\|^2$ (k=0, 1, ..., 15).

To calculate the LLR of $b_0^1$ to thereby determine whether $b_0^1$ is $-1$ or 1, the minimum $\|\tilde{y}-R^{(D)}\tilde{s}_k\|^2$ of symbol vectors with $b_0^1=1$ among 16 symbol vectors is subtracted from the minimum $\|\tilde{y}-R^{(D)}\tilde{s}_k\|^2$ of symbol vectors with $b_0^1=-1$.

As described before, the conventional ML detection scheme requires $|\Omega|^4$ candidates to calculate the LLR of each bit. In comparison, the first ML detection scheme of the present invention needs only $2|\Omega|^2$ candidates. When the LLRs of all bits included in one transmitted symbol vector are calculated, the number of candidates to be compared increases to $|\Omega|^4 \times 4\log_2|\Omega|$ in the conventional ML detection scheme, the present invention can decrease the number of candidates because candidates are compared not on a bit basis but on a symbol basis:

1st bit '0': I<0

1st bit '1': I>0

2nd bit '0': Q<0

2nd bit '1': Q>0.  [Eqn. 15]

In accordance with the present invention, the Euclidean distances of symbols from the origin on a constellation are calculated and each bit can be extracted by applying the Euclidean distances to Equation 15. In other words, the Euclidean distance of each candidate vector is calculated, rather than the Euclidean distances of all bits are calculated and each bit of an intended candidate vector is extracted according to Equation 15.

Equation 15 describes how to distinguish eight symbol vectors with $b_0^1=-1$ from eight symbol vectors with $b_0^1=1$. In other words, if the integer component of $s_1$ in $\tilde{s}_k$ is larger than 0, $b_0^1=1$ and if the integer component of $s_1$ is less than 0, $b_0^1=-1$.

The first ML detection scheme has been described above. Now a description will be made of the second ML detection scheme.

2. Second ML Detection Scheme

The computation of an optimal LLR of each bit included in $[s_1, s_2]^T$ can be modeled to a closest-point search (CPS) problem. By max-log approximation, the optimal LLR can be computed by Equation 13. For $[s_1, s_2]$, Equation (13) can be expressed as:

$$LLR(b_i^q) \approx \quad [\text{Eqn. 16}]$$

$$\frac{1}{2\sigma^2}\left(\underbrace{\min_{s_k|b_i^q=-1}\|\tilde{y}^{(U)}-R^{(U)}s_k\|^2}_{\text{part A}} - \underbrace{\min_{s_k|b_i^q=+1}\|\tilde{y}^{(U)}-R^{(U)}s_k\|^2}_{\text{part B}}\right)$$

$q \in \{1, 2\}$, $i$: the i-th bit

The computation of the optimal LLR amounts to computation of the minimum values of part A and part B in Equation 16. Thus, $$\text{minimum of part } A: \min_{s_k|b_i^q=-1}\|\tilde{y}^{(U)}-R^{(U)}s_k\|^2 \quad [\text{Eqn. 17}]$$

$$\text{minimum of part } B: \min_{s_k|b_i^q=+1}\|\tilde{y}^{(U)}-R^{(U)}s_k\|^2.$$

The minimization problem of Equation 17 is no better than the CPS problem. The CPS problem requires searching for $s_k$ with minimum values according to Equation 17. To distinguish $s_k$ with minimum values from other $s_k$, $s_k$ with a minimum value for an $i^{th}$ bit is represented as $\Lambda_{q,i,k}$ where q is the index of a transmit antenna, i is the index of a bit, and k is +1 or $-1$.

In summary, [Eqn. 18]

$$\Lambda_{q,i,k} = \arg\min_{s_k|b_i^q=j}\|\tilde{y}^{(D)}-R^{(D)}s_k\|^2,$$

where $q \in \{1, 2\}$, $k \in \{+1, -1\}$, and $\min_{s_k|b_i^q=j}\|\tilde{y}^{(D)}-R^{(D)}s_k\|^2 = \|\tilde{y}^{(D)}-R^{(D)}\Lambda_{q,i,k}\|^2$.

Thus, the optimal LLR is achieved by:

$$LLR(b_i^q) \approx \frac{1}{2\sigma^2}\left(\|\tilde{y}^{(D)}-R^{(D)}\Lambda_{q,i,-1}\|^2 - \|\tilde{y}^{(D)}-R^{(D)}\Lambda_{q,i,+1}\|^2\right), \quad [\text{Eqn. 19}]$$

$q \in \{1, 2\}$.

The CPS problem of Equation 18 is equivalent to the minimization problem given as Equation 20:

$$\Psi_{q,i,k} = \|\tilde{y}^{(D)}-R^{(D)}\Lambda_{q,i,k}\|^2 \quad [\text{Eqn. 20}]$$

$$= \min_{s_k|b_i^q=k}\|\tilde{y}^{(D)}-R^{(D)}s_k\|^2$$

$$= \min_{s_k|b_i^q=k}f(s_1, s_2, s_3, s_4),$$

where $f(s_1,s_2,s_3,s_4)=\|\tilde{y}^{(D)}-R^{(D)}s_k\|^2$. As stated before, it is known from a partially orthogonal channel matrix that $s_3, s_4$ are dependent on $s_1, s_2$. Thus, Equation 20 can be simplified to:

$$\Psi_{q,i,k} = \min_{s_1 \in \Omega, s_2 \in \Omega|b_i^q=k}f(s_1, s_2). \quad [\text{Eqn. 21}]$$

As a candidate vector of $s_3, s_4$ with a minimum distance in $\Phi^{(U)}$ is a hard-decision ML value, the hard-decision ML solution of $[\hat{s}_1, \hat{s}_2]^T$ is easily calculated. According to the present invention, an LLR is calculated after all as follows. The distance of a symbol is the Euclidean distance of the symbol from the origin on a signal constellation.

If the hard-decision ML solution $\hat{s}$ is known, the minimization problem of Equation 21 is posed as a relaxed minimization problem described by the following Equation:

$$\Psi_{q,i,k} = \min_{s_1 \in \Omega, s_2 \in \Omega|b_i^q=k}s(s_1, s_2) \quad [\text{Eqn. 22}]$$

$$\leq \min_{s_2 \in \Omega|b_i^q=k}f(\hat{s}_1, s_2)$$

$$\leq \min_{s_1 \in \Omega|b_i^q=k}f(s_1, \hat{s}_2),$$

where $\hat{s}_k$ denotes a $k^{th}$ element of the hard-decision ML solution $\hat{s}$.

Therefore, the complexity of solving the relaxed minimization problem decreases from $O(|\Omega|^2)$ to $O(2|\Omega|)$. Herein, $O(o)$ represents computational volume. As described above, when a solution is detected by minimization, the complexity is considerably reduced in a high-order modulation scheme such as 16-ary quadrature amplitude modulation (16QAM). $[s_3,s_4]^T$ can be detected using $[\hat{s}_1,s_2]^T$ and $[s_1,\hat{s}_2]^T$, and a new candidate vector set $\Phi_n$ can be formed. Here, $|\Phi_n|=2|\Omega|$. $\Phi_n$ includes information about all bits of $s_1$ and $s_2$ and to provide more information for LLR calculation, $\Phi=\Phi^{(U)} \cup \Phi_n$ is computed. Since $\Phi \supset \Phi^{(U)}$ for bits included in $[s_3,s_4]^T$, optimal LLRs are provided conventionally. On the other hand, candidate vectors are obtained for bits included in $[s_1,s_2]^T$ by the relaxed minimization problem, and thus sub-optimal LLRs are produced. Accordingly, LLRs are computed in the second ML detection scheme of the present invention by:

$$LLR(b_i^q) \approx \frac{1}{2\sigma^2}\left( \min_{s_k \in \Phi|b_i^q=-1} \|\tilde{y}^{(U)} - R^{(U)}s_k\|^2 - \min_{s_k \in \Phi|b_i^q=+1} \|\tilde{y}^{(U)} - R^{(U)}s_k\|^2 \right), \quad [\text{Eqn. 23}]$$

where $\Phi=\Phi^{(U)} \cup \Phi_n$.

Figure 2:
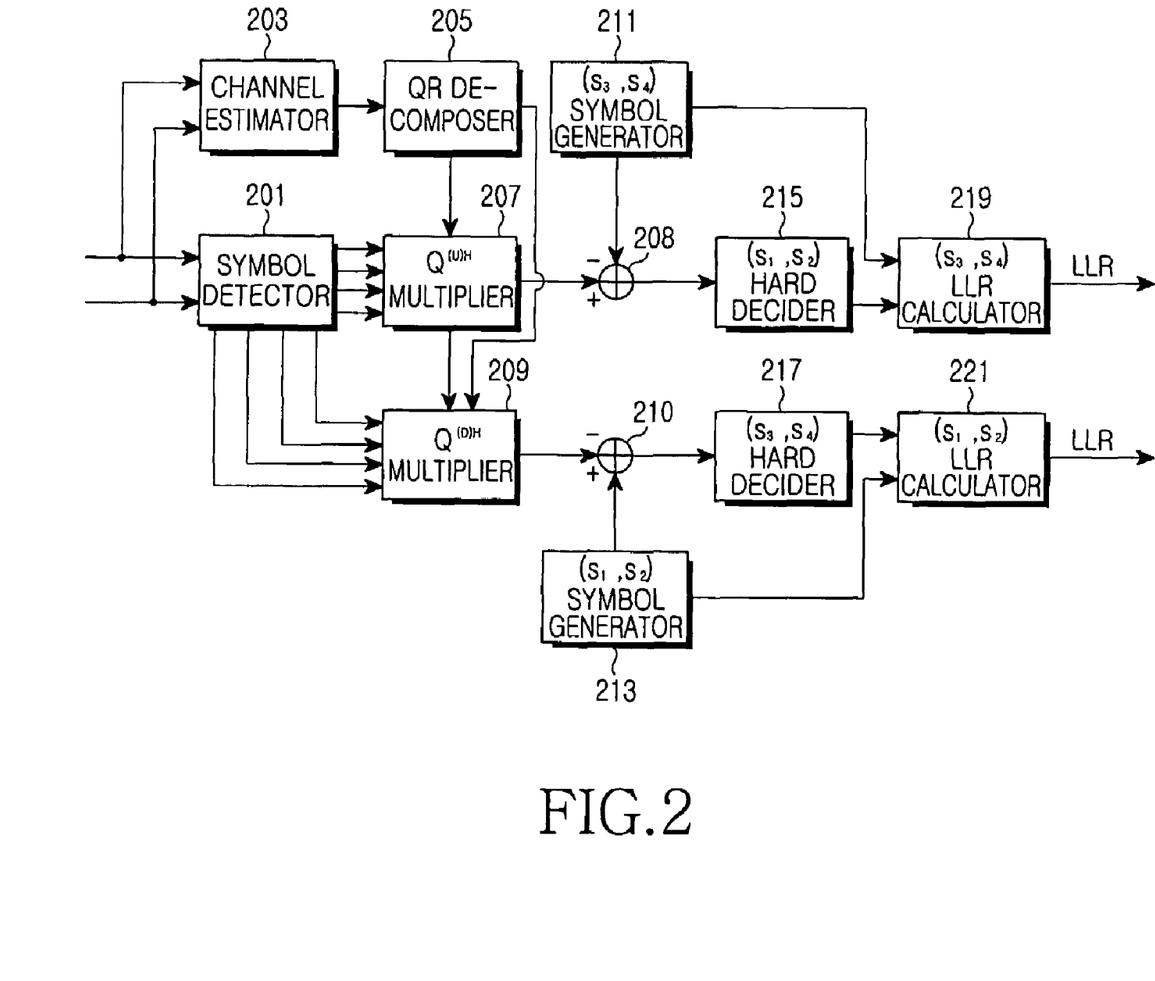
FIGS. 2 and 3 are detailed block diagrams of ML detectors according to exemplary embodiments of the present invention.

FIG. 2 is a detailed block diagram of a first ML detector according to an exemplary embodiment of the present invention.

Referring to FIG. 2, a symbol detector 201 forms a received signal vector by detecting symbols received during two OFDM symbol intervals. A channel estimator 203 estimates channels using the received symbols and outputs the estimated channel information, i.e., an equivalent channel matrix to a QR decomposer 205.

The QR decomposer 205 QR-decomposes the equivalent channel matrix and provides the QR decomposition result to a $Q^{(U)H}$ multiplier 207 and a $Q^{(D)H}$ multiplier 209. The $Q^{(U)H}$ multiplier 207 and the $Q^{(D)H}$ multiplier 209 multiply the received signal vector by $Q^{(U)H}$ and $Q^{(D)H}$, respectively.

An $(s_3, s_4)$ symbol generator 211 and an $(s_1, s_2)$ symbol generator 213 generate all candidate symbol combinations for $s_3$ and $s_4$ and for $s_1$ and $s_2$, respectively.

An adder/subtractor 208 eliminates $s_3$ and $s_4$ components from a received signal vector $\tilde{y}_1^{(U)}$ and $\tilde{y}_2^{(U)}$. An $(s_1, s_2)$ hard-decider 215 performs hard decision on symbols $s_1$ and $s_2$ from the received signal vector free of the $s_3$ and $s_4$ components. Similarly, an adder/subtractor 210 eliminates $s_1$ and $s_2$ components from a received signal vector $\tilde{y}_1^{(U)}$ and $\tilde{y}_2^{(U)}$. An $(s_3, s_4)$ hard-decider 217 performs hard decision on symbols $s_3$ and $s_4$ from the received signal vector free of the $s_1$ and $s_2$ components.

An $(s_3, s_4)$ LLR calculator 219 forms candidate vectors using the hard-decided symbols $s_1$ and $s_2$ and the combinations of $s_3$ and $s_4$ generated from the $(s_3, s_4)$ symbol generator 211 and calculates the LLRs of bits forming the symbols $s_3$ and $s_4$.

Similarly, an $(s_1, s_2)$ LLR calculator 221 forms candidate vectors using the hard-decided symbols $s_3$ and $s_4$ and the combinations of $s_1$ and $s_2$ generated from the $(s_1, s_2)$ symbol generator 213 and calculates the LLRs of bits forming the symbols $s_1$ and $s_2$.

Figure 3:
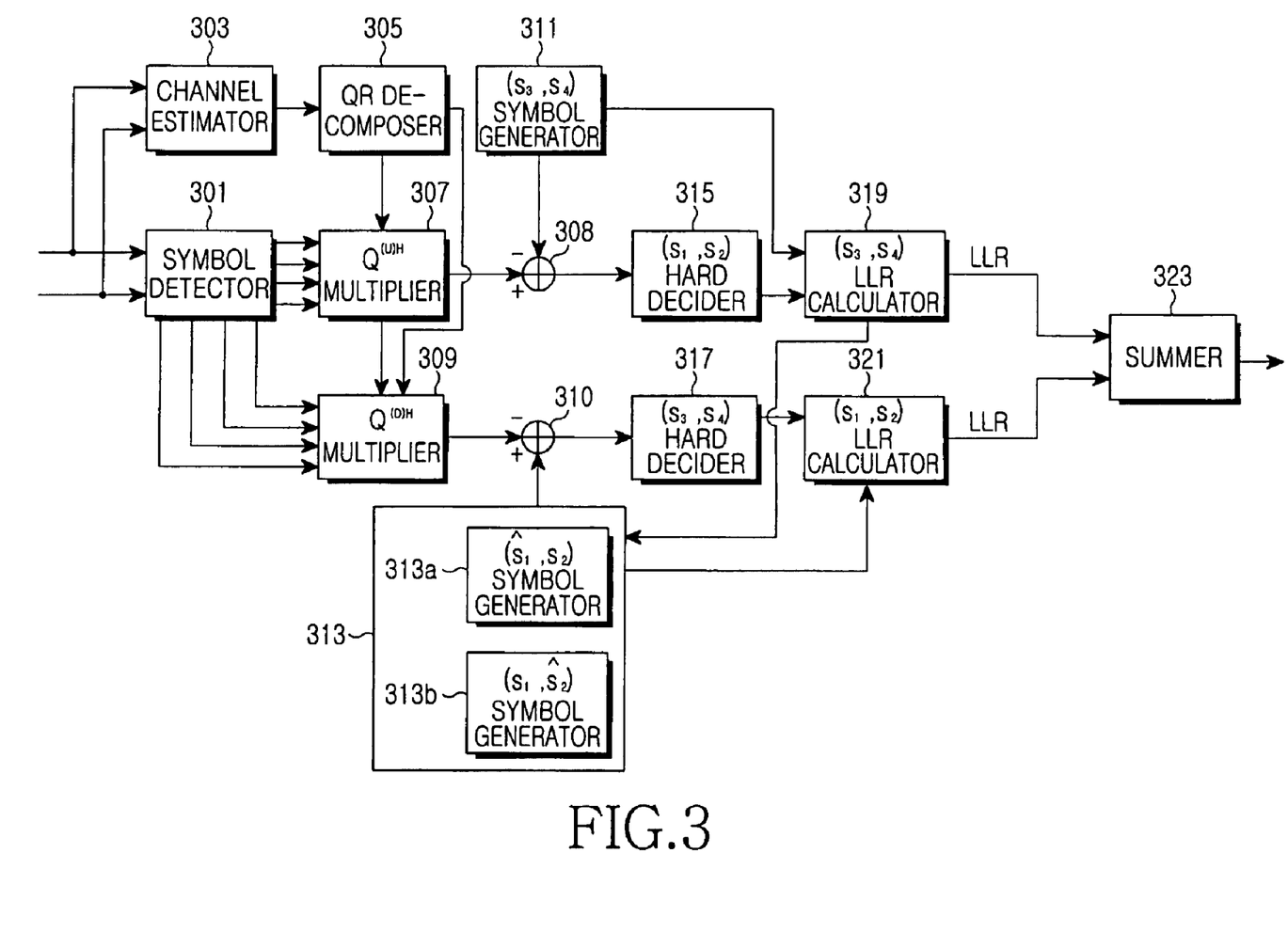

FIG. 3 is a detailed block diagram of a second ML detector according to another exemplary embodiment of the present invention.

Referring to FIG. 3, the second ML detector further includes a summer 323 and has a modified symbol generator 313 to implement a second ML detection scheme.

In the second ML detector, the symbol generator 313 generates candidate vectors with minimum distances for $s_3$ and $s_4$. The symbol generator 313 includes an $(\hat{s}_1,s_2)$ generator 313a for generating symbols $\hat{s}_1$ and $s_2$ and an $(s_1,\hat{s}_2)$ generator 313b for generating symbols $s_1$ and $\hat{s}_2$. Since $s_3$ and $s_4$ are dependent on $s_1$ and $s_2$ as noted from Equation 20 and Equation 21, $s_3$ and $s_4$ can be created using $s_1$ and $s_2$. The summer 323 calculates final LLRs by combining two candidate vectors.

Figure 4:
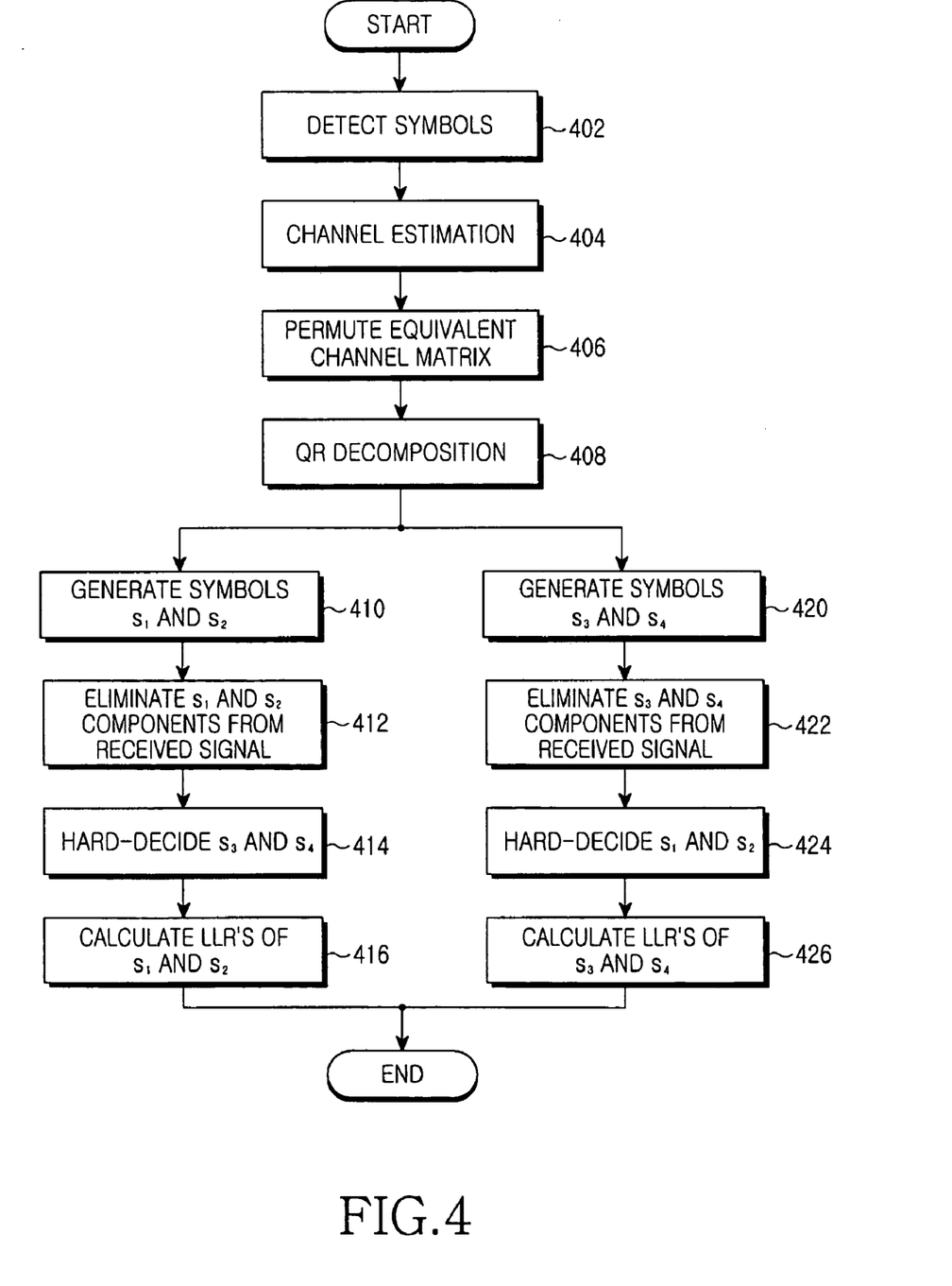
FIG. 4 is a flowchart illustrating an ML detection operation in the receiver according to an exemplary embodiment of the present invention.

FIG. 4 is a flowchart illustrating an ML detection operation in the receiver according to an exemplary embodiment of the present invention.

Referring to FIG. 4, the receiver detects symbols corresponding to a received signal in step 402 and estimates channels in step 404. The receiver permutes an equivalent channel matrix using a predetermined permutation matrix in step 406.

The receiver QR-decomposes the permuted equivalent channel matrix in step 408 and branches off into steps 410 and 420.

In step 410, the receiver creates all possible symbol combinations for $s_1$ and $s_2$. The receiver then eliminates $s_1$ and $s_2$ symbol components from the received signal in step 412 and makes a hard decision on $s_3$ and $s_4$ in step 414. In step 416, the receiver determines the LLRs of bits forming $s_1$ and $s_2$.

In step 420, the receiver creates all possible symbol combinations for $s_3$ and $s_4$. The receiver then eliminates $s_3$ and $s_4$ symbol components from the received signal in step 422 and makes a hard decision on $s_1$ and $s_2$ in step 424. In step 426, the receiver determines the LLRs of bits forming $s_3$ and $s_4$.

Figure 5:
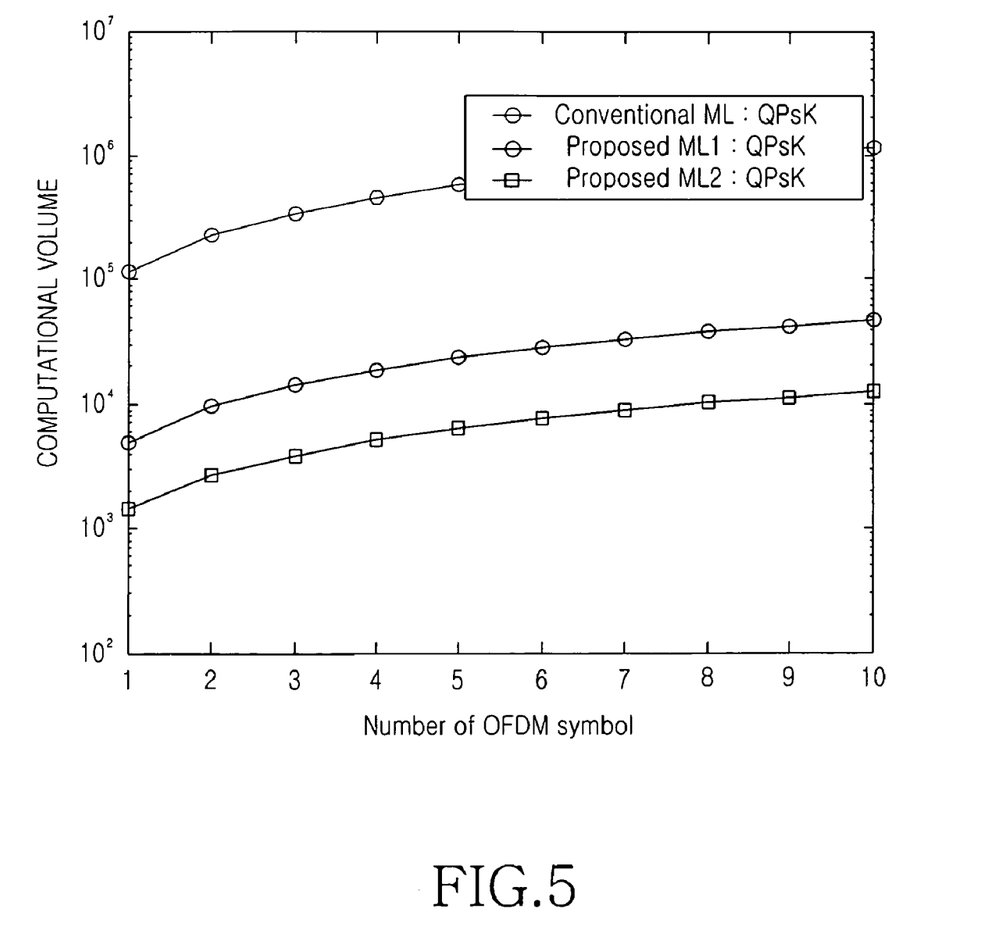
FIG. 5 is a graph comparing ML detection schemes according to exemplary embodiments of the present invention with a conventional ML detection scheme in terms of computational volume.

FIG. 5 is a graph comparing the ML detection schemes according to the exemplary embodiments of the present invention with a conventional ML detection scheme in terms of computational volume.

A simulation was performed under the following conditions.

TABLE 1

| Parameters | Value |
| --- | --- |
| Bandwidth | 20 MHz |
| Number of subcarriers | 64 |
| Subcarrier spacing | 0.3125 MHz |
| Guard interval | 0.8 μsec |
| Symbol interval | 4.0 μsec |
| Numbers of transmit and receive antennas | 4Tx Ant/2Rx Ant |
| Modulation scheme | QPSK/16 QAM |
| Channel coding | Convolutional code, R = ½, K = 7, g = [133 171]$_8$ |
| Channel model | Uniformly distributed channels (14 paths) |

The graph illustrated in FIG. 5 reveals that the conventional ML detection scheme requires a larger computational volume than the ML detection schemes of the present invention. The first ML detection scheme (Proposed ML1) calculates LLRs after calculating the distance of each bit, and the second ML detection scheme (Proposed ML2) extracts bit information and calculates LLRs after calculating the distance of each symbol.

As is apparent from the above description, the present invention advantageously reduces the volume of LLR computation by providing the simplified ML detection schemes.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for detecting a signal in a receiver by maximum likelihood (ML) comprising:
   detecting symbols from a received signal according to the number of transmit antennas of a transmitter and a modulation scheme;
   estimating channels using the detected symbols;
   determining an equivalent channel matrix corresponding to the estimated channels;
   determining a permuted equivalent channel matrix by multiplying the equivalent channel matrix by a predetermined permutation matrix;
   performing QR decomposition on the permuted equivalent channel matrix;
   performing a hard decision on first symbols among the detected symbols using symbols obtained from the QR decomposition; and
   determining the log likelihood ratios (LLRs) of second symbols other than the first symbol among the detected symbols using the hard-decided symbols and combinations of the first symbols.

2. The method of claim 1, wherein the predetermined permutation matrix is:

$$\Pi^{(U)} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

3. The method of claim 1, wherein the predetermined permutation matrix is:

$$\Pi^{(D)} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}.$$

4. The method of claim 1, wherein the result from QR-decomposing the permuted equivalent channel matrix is:

$$R^{(U)} = \begin{bmatrix} R_{1,1}^{(U)} & 0 & R_{1,3}^{(U)} & R_{1,4}^{(U)} \\ 0 & R_{1,1}^{(U)} & -R_{1,4}^{(U)*} & R_{1,3}^{(U)*} \\ 0 & 0 & R_{3,3}^{(U)} & 0 \\ 0 & 0 & 0 & R_{3,3}^{(U)} \end{bmatrix}.$$

5. The method of claim 1, wherein the result from QR-decomposing the permuted equivalent channel matrix is:

$$R^{(D)} = \begin{bmatrix} R_{1,1}^{(D)} & 0 & R_{1,3}^{(D)} & R_{1,4}^{(D)} \\ 0 & R_{1,1}^{(D)} & -R_{1,4}^{(D)*} & R_{1,3}^{(D)*} \\ 0 & 0 & R_{3,3}^{(D)} & 0 \\ 0 & 0 & 0 & R_{3,3}^{(D)} \end{bmatrix}.$$

6. The method of claim 1, wherein the LLR determination comprises:
   eliminating components corresponding to the second symbols from the received signal to output a received signal free of the components corresponding to the second symbols;
   performing a hard decision on the first symbols from the received signal free of the components corresponding to the second symbols; and
   calculating the log likelihood ratios (LLRs) of the second symbols using the hard-decided symbols and candidate symbol combinations of the first symbols.

7. The method of claim 6, further comprising detecting a symbol with a minimum value in the second symbols after the hard decision.

8. An apparatus for detecting a signal by maximum likelihood (ML) in a receiver, comprising:
   a symbol detector for detecting symbols from a received signal according to the number of transmit antennas of a transmitter and a modulation scheme;
   a channel estimator for estimating channels and determining an equivalent channel matrix corresponding to the estimated channels;
   a QR decomposer for determining a permuted equivalent channel matrix by multiplying the equivalent channel matrix by a predetermined permutation matrix and performing QR decomposition on the permuted equivalent channel matrix; and
   a log likelihood ratios (LLR) calculator for performing hard decision on first symbols among the detected symbols using the symbols obtained from the QR decomposition and determining the log likelihood ratios (LLRs) of second symbols other than the first symbol among the detected symbols using the hard-decided symbols and combinations of the first symbols.

9. The apparatus of claim 8, wherein the predetermined permutation matrix is:

$$\Pi^{(U)} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}.$$

10. The apparatus of claim 8, wherein the predetermined permutation matrix is:

$$\Pi^{(D)} = \begin{bmatrix} 0 & 0 & 1 & 0 \\ 0 & 0 & 0 & 1 \\ 1 & 0 & 0 & 0 \\ 0 & 1 & 0 & 0 \end{bmatrix}.$$

11. The apparatus of claim 8, wherein the result from QR-decomposing the permuted equivalent channel matrix is:

$$R^{(U)} = \begin{bmatrix} R_{1,1}^{(U)} & 0 & R_{1,3}^{(U)} & R_{1,4}^{(U)} \\ 0 & R_{1,1}^{(U)} & -R_{1,4}^{(U)*} & R_{1,3}^{(U)*} \\ 0 & 0 & R_{3,3}^{(U)} & 0 \\ 0 & 0 & 0 & R_{3,3}^{(U)} \end{bmatrix}.$$

12. The apparatus of claim 8, wherein the result from QR-decomposing the permuted equivalent channel matrix is:

$$R^{(D)} = \begin{bmatrix} R_{1,1}^{(D)} & 0 & R_{1,3}^{(D)} & R_{1,4}^{(D)} \\ 0 & R_{1,1}^{(D)} & -R_{3,3}^{(D)} & 0 \\ 0 & 0 & R_{3,3}^{(D)} & 0 \\ 0 & 0 & 0 & R_{3,3}^{(D)} \end{bmatrix}.$$

13. The apparatus of claim 8, further comprising:
a hard decider for eliminating components corresponding to the second symbols from the received signal to output a received signal free of the components corresponding to the second symbols, and performing a hard decision on the second symbols from the received signal free of the components corresponding to the first symbols.

14. The apparatus of claim 13, wherein the symbol generator detects a symbol with a minimum value in the second symbols after the hard decision.

* * * * *